(12) United States Patent
Hosokawa et al.

(10) Patent No.: US 10,041,551 B2
(45) Date of Patent: Aug. 7, 2018

(54) DRIVING FORCE TRANSMISSION APPARATUS

(71) Applicant: JTEKT CORPORATION, Osaka-shi (JP)

(72) Inventors: Takashi Hosokawa, Takahama (JP); Yasunari Hasegawa, Anjo (JP); Nobutsuna Motohashi, Katsuragi (JP)

(73) Assignee: JTEKT CORPORATION, Osaka-shi (JP)

( * ) Notice: Subject to any disclaimer, the term of this patent is extended or adjusted under 35 U.S.C. 154(b) by 522 days.

(21) Appl. No.: 14/719,860

(22) Filed: May 22, 2015

(65) Prior Publication Data

US 2015/0345572 A1    Dec. 3, 2015

(30) Foreign Application Priority Data

May 27, 2014  (JP) .................. 2014-109389

(51) Int. Cl.
*F16D 27/14*  (2006.01)
*F16D 27/118*  (2006.01)
*F16D 23/04*  (2006.01)
*F16D 27/11*  (2006.01)

(52) U.S. Cl.
CPC .............. *F16D 27/14* (2013.01); *F16D 23/04* (2013.01); *F16D 27/11* (2013.01); *F16D 27/118* (2013.01); *F16D 2500/50239* (2013.01)

(58) Field of Classification Search
CPC ............................................. F16D 2023/0687
See application file for complete search history.

(56) References Cited

U.S. PATENT DOCUMENTS

2008/0067028 A1*  3/2008  Nagaya .................. F16D 27/112
                                                    192/84.941
2010/0089685 A1*  4/2010  Quehenberger ...... F16D 27/118
                                                    180/383

FOREIGN PATENT DOCUMENTS

WO    WO 2005/106272 A1    11/2005

OTHER PUBLICATIONS

U.S. Appl. No. 14/719,843, filed May 22, 2015, Hosokawa, et al.

\* cited by examiner

*Primary Examiner* — Mark A Manley
(74) *Attorney, Agent, or Firm* — Oblon, McClelland, Maier & Neustadt, L.L.P.

(57) ABSTRACT

A driving force transmission apparatus includes: a meshing member that switches two rotating members between a coupled state and an uncoupled state; a piston member with a plurality of locked portions formed along a circumferential direction; an armature that moves the piston member forward and backward between a first position where the armature presses the piston member in an axial direction and a second position where the armature does not press the piston member; a biasing member that biases the piston member in the opposite direction from the pressing direction of the armature; and a locking member that locks the locked portions. The piston member has a mechanism that mitigates a possible shock when the locking member comes into abutting contact with an abutting contact surface of a first locked portion.

1 Claim, 10 Drawing Sheets

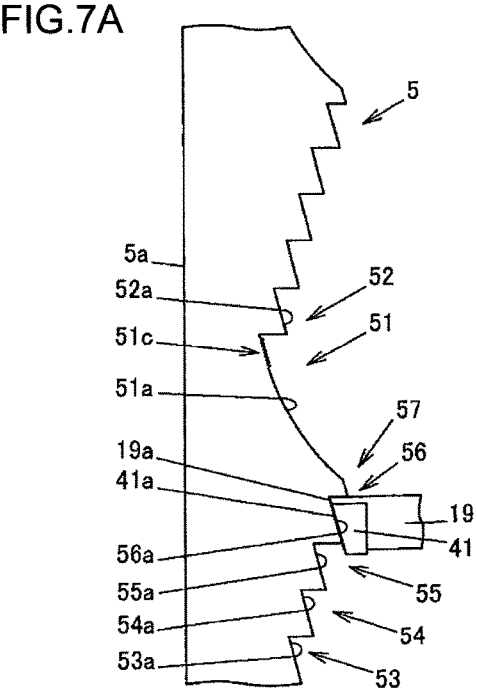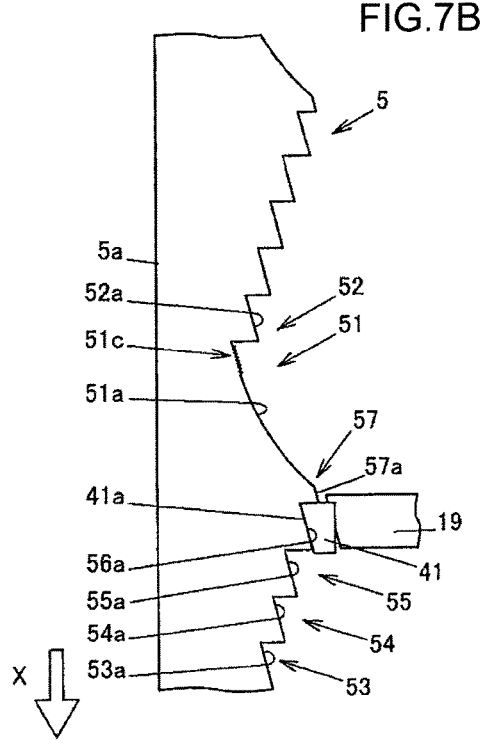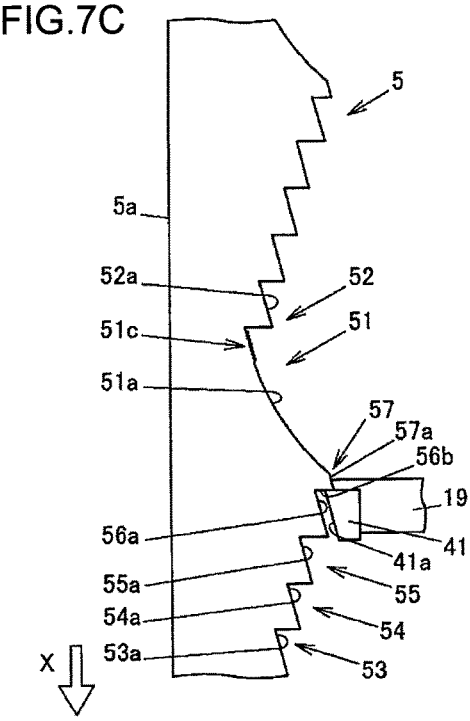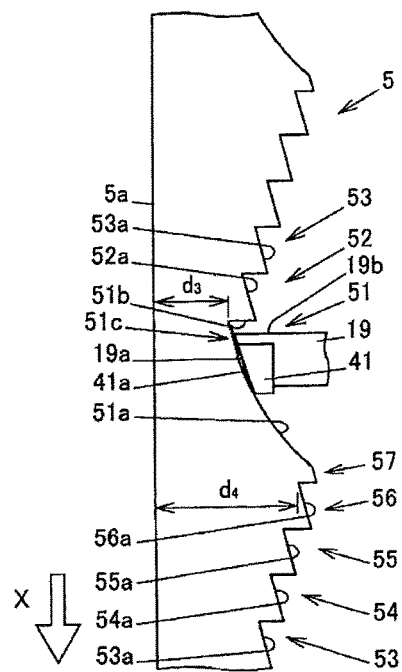

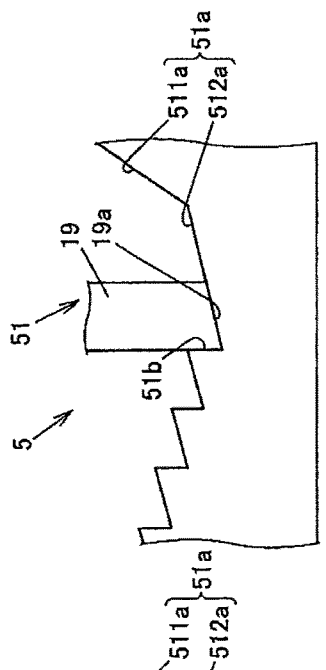

US 10,041,551 B2

DRIVING FORCE TRANSMISSION APPARATUS

INCORPORATION BY REFERENCE

The disclosure of Japanese Patent Application No. 2014-109389 filed on May 27, 2014 including the specification, drawings and abstract, is incorporated herein by reference in its entirety.

BACKGROUND OF THE INVENTION

1. Field of the Invention

The present invention relates to a driving force transmission apparatus that transmits a driving force between rotating members.

2. Description of Related Art

Driving force transmission apparatuses are known which are used, for example, for a driving force transmission system in a vehicle and which enable connection and disconnection of transmission of a driving force between rotating members. See, for example, International Publication No. WO 2005/106272.

A clutch apparatus described in International Publication No. WO 2005/106272 is used for a speed change gear in a vehicle and includes a first frictional disc engaged with an outer peripheral surface of a shaft-like clutch hub in a splined manner, a second frictional disc engaged with a cylindrical clutch drum in a splined manner, an electric motor that generates mechanical power pressing the first frictional disc and the second frictional disc against each other, and a lock mechanism that allows the pressing force to be maintained between the first frictional disc and the second frictional disc while current supply to the electric motor is blocked. The mechanical power of the electric motor is decelerated by a speed reduction mechanism and converted into linear motion by a cam mechanism to actuate the lock mechanism.

The second embodiment in International Publication No. WO 2005/106272 (see FIG. 11) describes a cylindrical latch mechanism used as the lock mechanism, which has a first internal cylinder with a switching slope, an external cylinder with shallow grooves and deep grooves alternately arranged in a circumferential direction as positioning grooves, and a second internal cylinder with a moving pin. In the cylindrical latch mechanism, the switching slope of the first internal cylinder allows the moving pin on the second internal cylinder to move between the shallow groove and the deep groove in the external cylinder, enabling switching between a lock state where the moving pin is held in the shallow groove and an unlock state where the moving pin is held in the deep groove.

Enhanced performance of recent vehicles contributes to improved interior silence, with the result that a user such as a driver is likely to hear an operating sound of the driving force transmission apparatus. This tendency is significant, for example, in vehicles including the electric motor as a driving source. The operating sound may be abnormal sound or noise to occupants, who may thus feel unpleasant. Consequently, further improvement of the silence of the driving force transmission apparatus has been demanded.

However, when the cylindrical latch mechanism described in International Publication No. WO 2005/106272 is used, collision sound is generated, during operation of the cylindrical latch mechanism, by collisions between the moving pin on the second internal cylinder and bottom surfaces of the positioning grooves in the external cylinder. The collision sound may be heard by the user.

SUMMARY OF THE INVENTION

An object of the present invention is to provide a driving force transmission apparatus that allows operating sound to be suppressed.

A driving force transmission apparatus according to an aspect of the present invention includes: a first rotating member;

a second rotating member;

a switching member that moves in an axial direction to enable switching of the first rotating member and the second rotating member between a coupled state and an uncoupled state;

a cylindrical piston member that includes a plurality of locked portions formed like steps along a circumferential direction and that moves in the axial direction along with the switching member;

a pressing member arranged facing the locked portions of the piston member and moving forward and backward between a first position where the pressing member presses the piston member in the axial direction and a second position where the pressing member does not press the piston member;

a biasing member that biases the piston member in the opposite direction from a pressing direction of the pressing member; and a locking member that locks a locked portion of the plurality of locked portions. The locked portion of the piston member is provided with an inclined surface inclined with respect to a circumferential direction of the piston member and an abutting contact surface that comes into abutting contact with the locking member in the circumferential direction. The pressing member moves to the first position to press the inclined surface of the locked portion and rotates the piston member by a predetermined amount to cause the inclined surface of an adjacent locked portion to face the locking member. When the pressing member returns to the second position, the locking member slides on the inclined surface to come into abutting contact with the abutting contact surface. The piston member includes a shock mitigation mechanism to mitigate a possible shock when the locking member comes into abutting contact with the abutting contact surface.

The driving force transmission apparatus according to the above aspect allows the operating sound of the driving force transmission apparatus to be suppressed.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIGS. 7A to 7D are schematic diagrams illustrating operations of the piston member and the armature along with the locking member at a time when the driving force transmission apparatus shifts from an uncoupled state to a coupled state;

FIG. 10A, FIG. 10B, and FIG. 10C are schematic diagrams of a piston member and a locking member illustrating a shock mitigation mechanism of the piston member according to a third embodiment.

DETAILED DESCRIPTION OF EMBODIMENTS

Embodiments of the present invention will be described with reference to the attached drawings.

Figure 1:
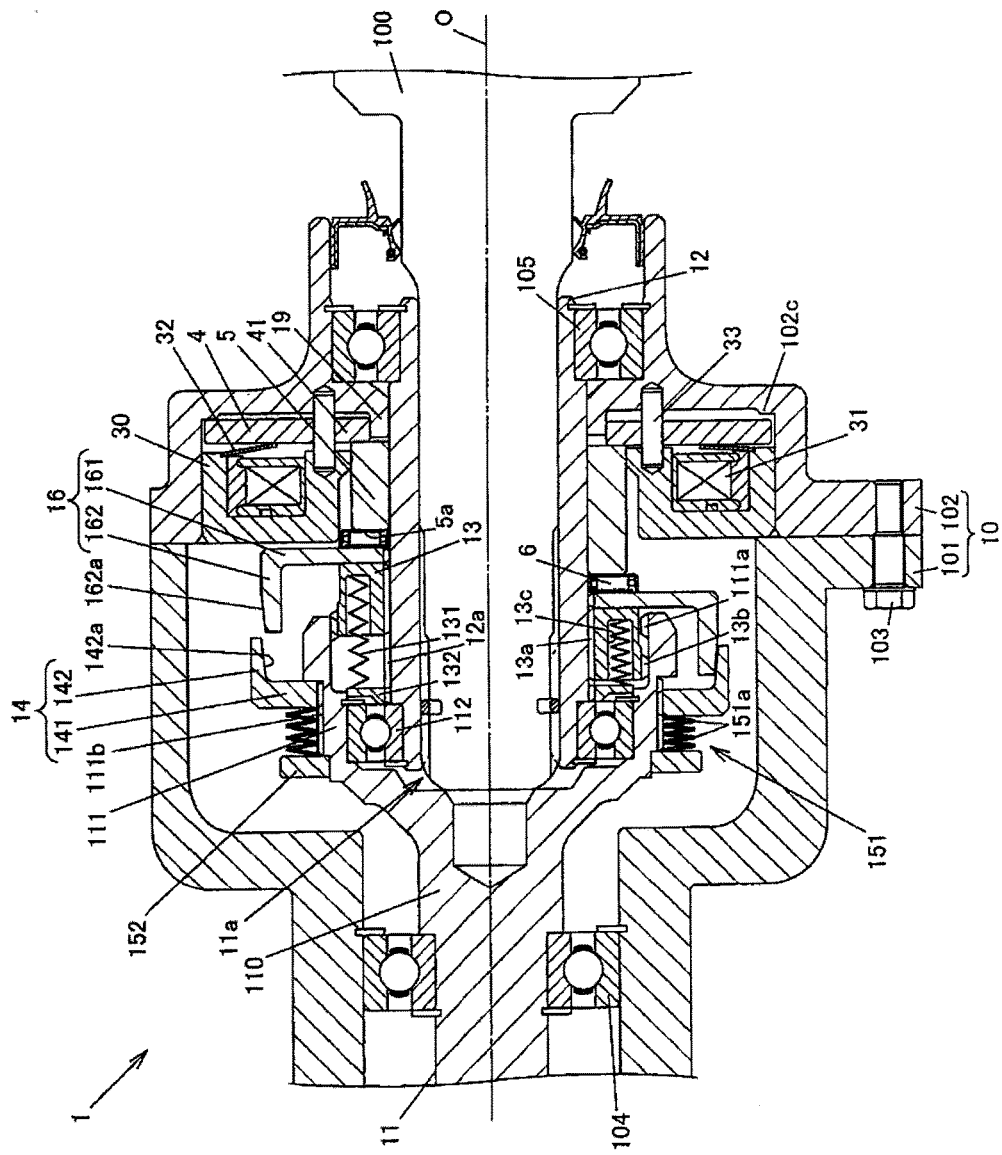
FIG. 1 is a sectional view of a driving force transmission apparatus according to an embodiment of the present invention.

FIG. 1 is a cross-sectional view of a driving force transmission apparatus according to a first embodiment of the present invention. The driving force transmission apparatus is used, for example, to transmit a driving force of a driving source to allow a vehicle to travel so that the driving force can be connected and disconnected.

A driving force transmission apparatus 1 includes a first rotating member 11 and a second rotating member 12 supported by a housing 10 so that the first rotating member 11 and the second rotating member 12 can rotate relative to each other. The driving force transmission apparatus 1 enables switching between a coupled state where the first rotating member 11 and the second rotating member 12 are coupled together so as to enable the driving force to be transmitted and an uncoupled state where the transmission of the driving force between the first rotating member 11 and the second rotating member 12 is blocked. In FIG. 1, the coupled state is depicted on a side above an axis of rotation O, and the uncoupled state is depicted on a side below the axis of rotation O.

The housing 10 includes a first housing member 101 and a second housing member 102. The first housing member 101 and the second housing member 102 are coupled together via a bolt 103.

The first rotating member 11 integrally has a shaft portion 110 rotatably supported by a ball bearing 104 in the housing 10 and a tubular portion 111 provided at a second housing member 102-side end of the shaft portion 110. The tubular portion 111 is shaped like a cylinder in which a housing space 11a is formed, and has an outer diameter formed to be larger than the outer diameter of the shaft portion 110. The housing space 11a is open at an end thereof opposite to the shaft portion 110.

One end of the cylindrical second rotating member 12 is housed in the housing space 11a. The second rotating member 12 is fitted, in a splined manner, over a shaft inserted through the second rotating member 12 and rotates integrally with the shaft 100. The second rotating member 12 is supported by a ball bearing 112 arranged between an outer peripheral surface of the second rotating member 12 and an inner peripheral surface of the tubular portion 111 at the housing space 11a so as to be rotatable relative to the first rotating member 11. Furthermore, a ball bearing 105 is arranged between: an outer peripheral surface of an end of the second rotating member 12 on the opposite side of the second rotating member 12 from the tubular portion 111; and an inner surface of the housing 10.

A plurality of spline protrusions 12a is formed on the outer peripheral surface of the second rotating member 12. A tubular meshing member 13 is fitted over the second rotating member 12 as a switching member that moves in an axial direction to enable the first rotating member 11 and the second rotating member 12 to be switched between the coupled state and the uncoupled state. Furthermore, spline protrusions 13a formed on an inner peripheral surface of the meshing member 13 are engaged with the spline protrusions 12a of the second rotating member 12. Thus, the meshing member 13 is not able to rotate relative to the second rotating member 12 but is movable in the axial direction.

A plurality of axial holes 13c is formed in the meshing member 13, and one end of a biasing member 131 is housed in the axial hole 13c. The other end of the biasing member 131 is in abutting contact with a receiving member 132 that engages with the spline protrusions 12a of the second rotating member 12 so that axial movement of the receiving member 132 is regulated by the ball bearing 112. In the present embodiment, the biasing member 131 is formed of a coil spring to bias the meshing member 13 in a direction away from the receiving member 132. However, the biasing member 131 is not limited to the coil spring but may be configured using a combination of a plurality of disc springs. The biasing member 131 may be an elastomer such as rubber.

A plurality of spline teeth 13b is formed on an outer periphery of the meshing member 13. A plurality of spline teeth 111a is formed on an inner periphery of the tubular portion 111 of the first rotating member 11. The spline teeth 13b of the meshing member 13 and the spline teeth 111a of the first rotating member 11 mesh with one another at a position where the meshing member 13 is separated from the receiving member 132. The meshing between the spline teeth 13b of the meshing member 13 and the spline teeth 111a of the first rotating member 11 is released at a position where the meshing member 13 is in proximity to the receiving member 132. In FIG. 1, a state where the spline teeth 13b of the meshing member 13 and the spline teeth 111a of the first rotating member 11 mesh with one another is depicted above the axis of rotation O. A state where the meshing between the spline teeth 13b of the meshing member 13 and the spline teeth 111a of the first rotating member 11 is released is depicted below the axis of rotation O When the meshing member 13 moves in the axial direction to mesh the spline teeth 13b with the spline teeth 111a of the first rotating member 11, the first rotating member 11 and the second rotating member 12 are coupled together so as to enable torque to be transmitted via the meshing member 13. On the other hand, when the meshing between the spline teeth 13b of the meshing member 13 and the spline teeth 111a of the first rotating member 11 is released, the first rotating member 11 and the second rotating member 12 are rotatable relative to each other, blocking the transmission of torque between the first rotating member 11 and the second rotating member 12.

An annular first frictional member 14 is fitted over an outer periphery of the tubular portion 111 of the first rotating member 11. The first frictional member 14 integrally has a disc-like main body portion 141 and a rib portion 142 protruding from an outer peripheral side end of the main body portion 141 in the axial direction. The main body portion 141 is engaged, at an inner peripheral end thereof, with the plurality of spline protrusions 111b formed on an outer peripheral surface of the tubular portion 111. Thus, the first frictional member 14 is relatively non-rotatable and axially movable with respect to the first rotating member 11. An inner peripheral surface of the rib portion 142 is tapered such that an inner diameter of the rib portion 142 increases toward an axial tip of the rib portion 142.

The first frictional member 14 is biased toward the opposite side of the first rotating member 11 from the shaft portion 110 by an elastic member 151 and is in abutting contact with a step portion formed on the tubular portion 111 so as to regulate axial movement of the first frictional member 14 toward a tip side of the tubular portion 111. The elastic member 151 includes a plurality of disc springs 151a arranged in the axial direction and is arranged between the first frictional member 14 and an annular member 152 fixed to the tubular portion 111 so as to be compressed in the axial direction.

The first frictional member 14 slides frictionally on a second frictional member 16 arranged so as to be relatively non-rotatable and axially movable with respect to the second rotating member 12. The first frictional member 14 transmits a torque between the first rotating member 11 and the second rotating member 12.

The second frictional member 16 integrally has a disc-like main body portion 161 and a rib portion 162 protruding from an outer peripheral side end of the main body portion 161 in the axial direction. The main body portion 161 is engaged, at an inner peripheral end thereof, with the plurality of spline protrusions 12a formed on an outer peripheral surface of the second rotating member 12. Thus, the second frictional member 16 is relatively non-rotatable and axially movable with respect to the second rotating member 12. An outer peripheral surface 162a of the rib portion 162 is tapered such that an outer diameter of the rib portion 162 decreases toward an axial tip of the rib portion 162.

A side surface of the main body portion 161 of the second frictional member 16 is in contact with the meshing member 13 so that the second frictional member 16 moves with the meshing member 13 in the axial direction. When the second frictional member 16 moves toward the first frictional member 14 side, the outer peripheral surface 162a of the rib portion 162 comes into surface contact with an inner peripheral surface 142a of the rib portion 142. In this regard, the elastic member 151 biasing the first frictional member 14 toward the second frictional member 16 side is compressed, and exerts a restoration force to press the first frictional member 14 against the second frictional member 16 side. Thus, the inner peripheral surface 142a of the rib portion 142 of the first frictional member 14 comes into frictional contact with the outer peripheral surface 162a of the rib portion 162 of the second frictional member 16.

The meshing member 13 and the second frictional member 16 are moved in the axial direction by operations of an electromagnetic coil 31, an armature 4, and a piston member 5. The electromagnetic coil 31 is supplied with a coil current by a controller not depicted in the drawings to generate a magnetic force. The armature 4 is attracted to the electromagnetic coil 31 side by the magnetic force when the electromagnetic coil 31 is energized. The electromagnetic coil 31 is held by an annular yoke 30. A disc spring 32 that biases the armature 4 in a direction away from the electromagnetic coil 31 is arranged between the yoke 30 and the armature 4.

Figure 2:
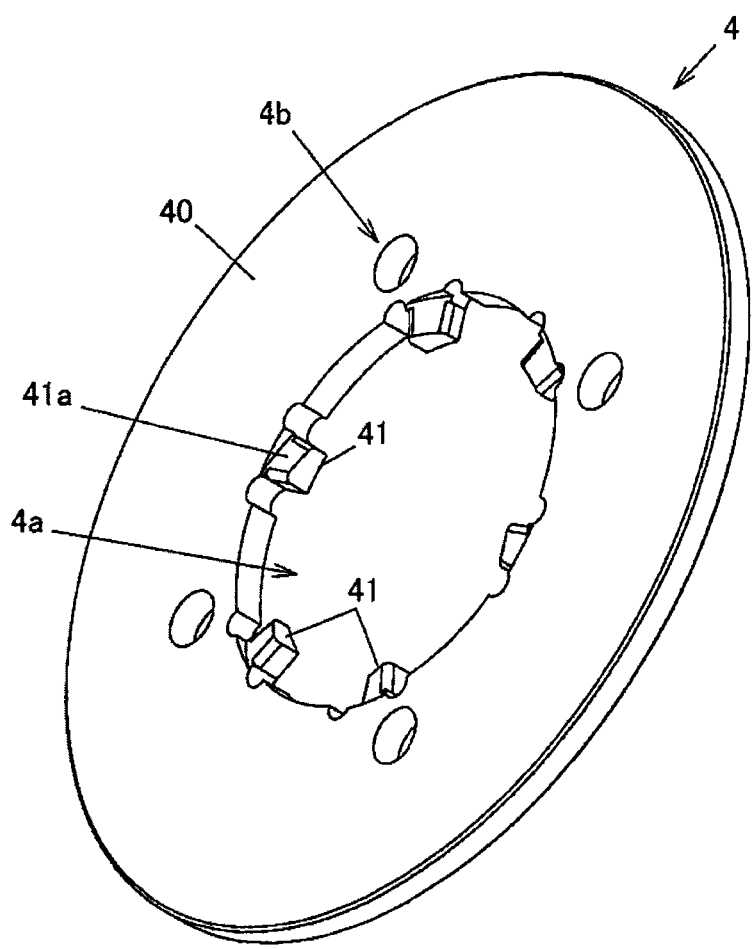
FIG. 2 is a perspective view depicting an armature.

FIG. 2 is a perspective view depicting the armature 4. The armature 4 integrally has a main body 40 shaped like an annular plate and having a through-hole 4a formed in a central portion of the armature 4 and through which the second rotating member 12 is inserted, and a plurality of (six in the present embodiment) pressing protrusions 41 protruding from an inner peripheral surface of the through-hole 4a toward the center of the main body 40. In the main body 40, pin insertion holes 4b through which a plurality of pins 33 (depicted in FIG. 1) is inserted are formed at four positions around the through-hole 4a. On the pressing protrusions 41, an opposite surface 41a facing corresponding one of inclined surfaces 51a to 56a of a first to a sixth locked portions 51 to 56 of the piston member 5 described below is formed as an inclined surface inclined with respect to a thickness direction (parallel to the axis of rotation O) of the main body 40.

The armature 4 is elastically pressed in a direction away from the yoke 30 by the disc spring 32. The armature 4 is in abutting contact with a receiving portion 102c of the second housing member 102 by the pressing force of the disc spring 32 while the electromagnetic coil 31 is not energized. The armature 4 is attracted to the yoke 30 by the magnetic force of the electromagnetic coil 31 when the electromagnetic coil 31 is energized. Rotation of the armature 4 with respect to the second housing member 102 and the yoke 30 is regulated by the plurality of pins 33 inserted through the pin insertion holes 4b. Therefore, the armature 4 is guided by the plurality of pins 33 to move between a yoke 30-side position and a position where the armature 4 is in abutting contact with the receiving portion 102c of the second housing member 102.

The pressing protrusions 41 of the armature 4 are arranged facing the plurality of locked portions of the piston member 5 in the axial direction. The armature 4 moves forward and backward between a position where the armature 4 presses the piston member 5 in the axial direction (this position is hereinafter referred to as the first position) and a position where the armature 4 does not press the piston member 5 (this position is hereinafter referred to as the second position). In the present embodiment, the electromagnetic coil 31 is energized to move the armature 4 to the yoke 30-side first position, and the energization of the electromagnetic coil 31 is blocked to move the armature 4 to the second position where the armature 4 is in abutting contact with the receiving portion 102c of the second housing member 102. A locking member 19 locks any one of the plurality of locked portions.

The piston member 5 is wholly formed of a synthetic resin and fitted over the second rotating member 12 as depicted in FIG. 1. Specific examples of the synthetic resin as the material of the piston member 5 include polyacetal and polyamide.

The piston member 5 is loosely fitted over the second rotating member 12 and is axially movable and relatively rotatable with respect to the second rotating member 12. A rolling bearing 6 is arranged between the second frictional member 16 and the piston member 5. In the present embodiment, the rolling bearing 6 includes a needle-like thrust roller bearing.

The second frictional member 16 and the meshing member 13 are pressed against the piston member 5 side by the bias force of the biasing member 131. Thus, the piston member 5 moves in the axial direction along with the second frictional member 16 and the meshing member 13.

The piston member 5 receives the pressing force of the biasing member 131 from the meshing member 13 and the second frictional member 16 via the rolling bearing 6 as an axial bias force toward the side of a plurality of the locking members 19. That is, the biasing member 131 biases the piston member 5 in the opposite direction from the pressing direction of the armature 4. In the present embodiment, the plurality of locking members 19 is provided integrally with the second housing member 102 but may be separate from the second housing member 102.

The piston member 5 moves in accordance with axial movement of the armature 4 and presses the meshing member 13 in the axial direction along the axis of rotation O in a direction in which the meshing between the spline teeth 13b of the meshing member 13 and the spline teeth 111a of the first rotating member 11 is released.

Figure 3:
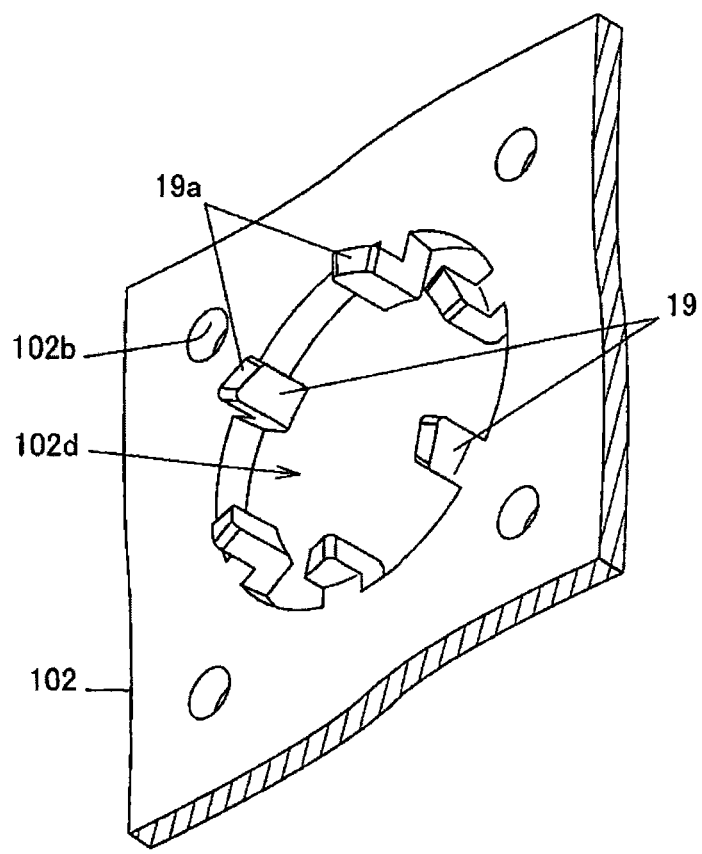
FIG. 3 is a perspective view depicting a plurality of locking members provided on a second housing member.

FIG. 3 is a perspective view depicting the plurality of locking members 19 provided on the second housing member 102.

A through-hole 102d through which the second rotating member 12 is inserted is formed in the second housing member 102. The plurality of locking members 19 projects from an inner peripheral surface of the through-hole 102d toward the first rotating member 11 and also protrudes toward the piston member 5 side along the axis of rotation O. The locking member 19 locks any one of the plurality of locked portions 51 to 56 of the piston member 5. The plurality of locking members 19 is provided at regular intervals along a circumferential direction of the through-hole 102d. The number of the locking members 19 is the same as the number of the pressing protrusions 41 of the armature 4. On the locking member 19, a tip surface 19a facing corresponding one of the inclined surfaces 51a to 56a of the locked portions 51 to 56 of the piston member 5 described below is formed as an inclined surface inclined with respect to a direction parallel to the axis of rotation O as is the case with the opposite surface 41a of the pressing protrusion 41 of the armature 4. Furthermore, a plurality of hole portions 102b into which the other ends of the pins 33 are fitted is formed in the second housing member 102.

Figure 4A:
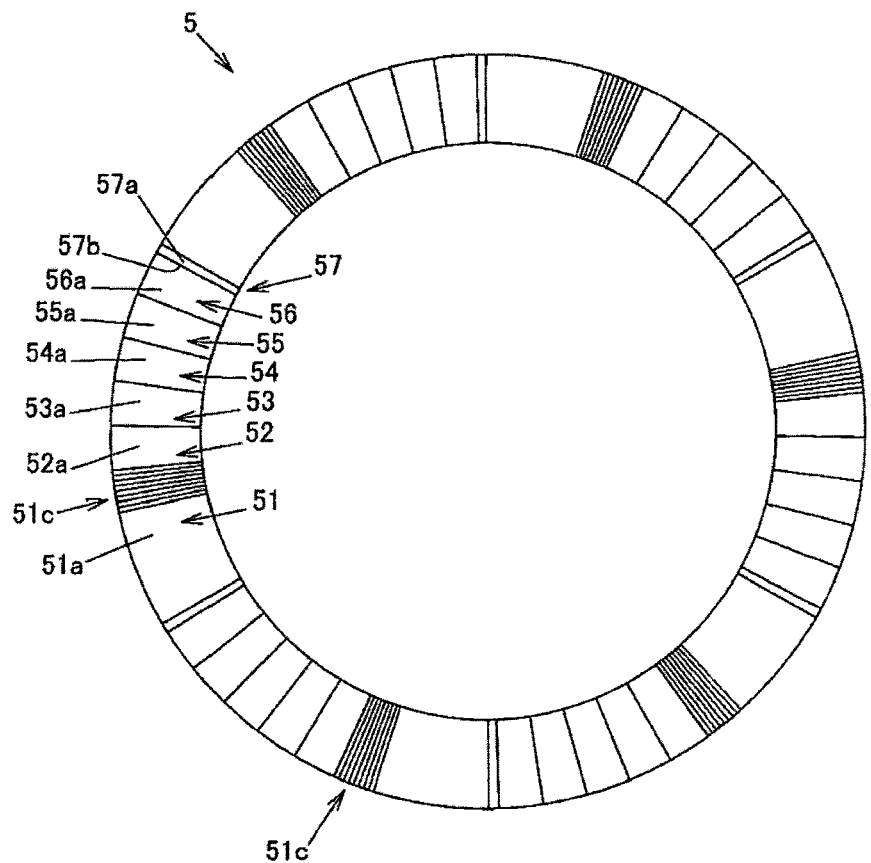
FIG. 4A is a plan view depicting the piston member.
Figure 4B:
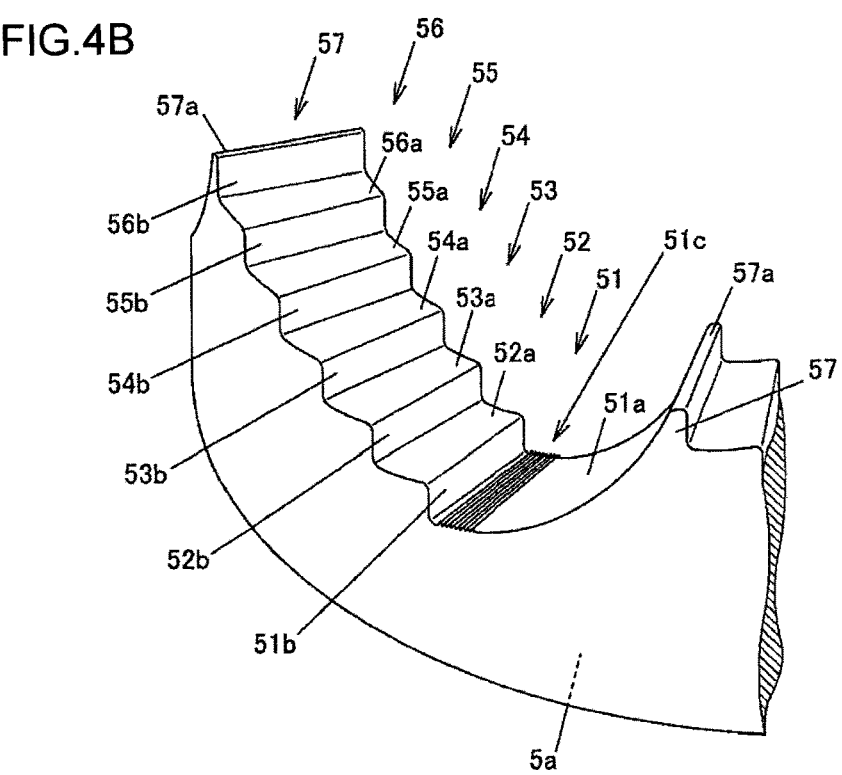
FIG. 4B is a perspective view depicting a part of the piston member.
Figure 5:
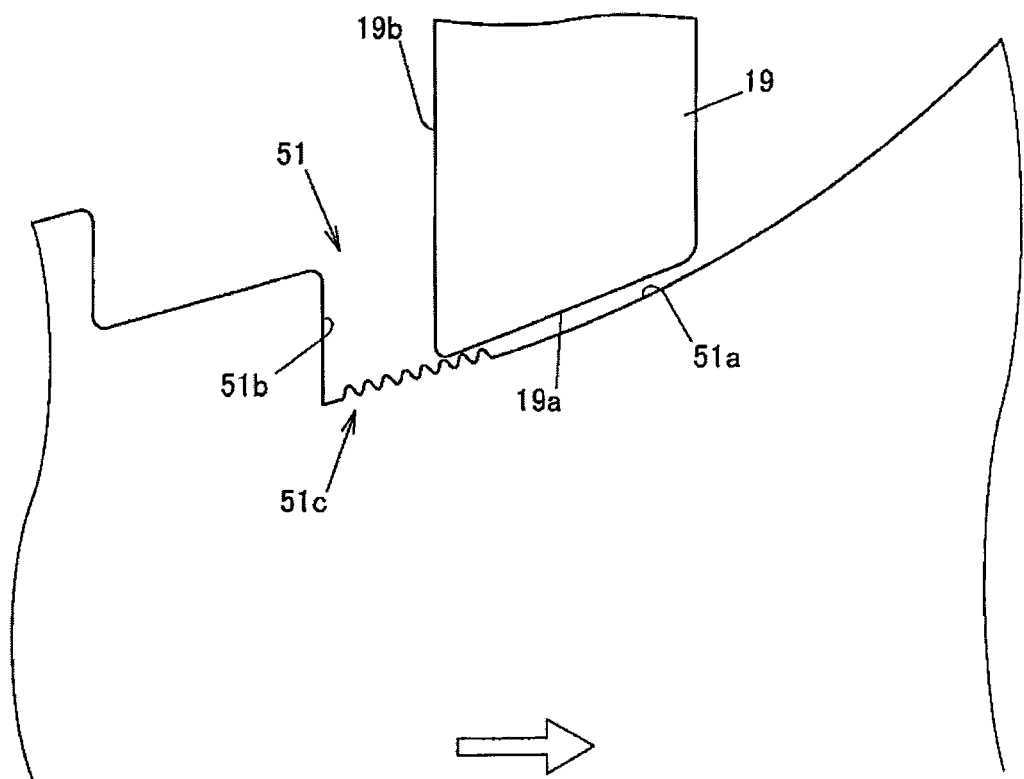
FIG. 5 is an enlarged view of the piston member as viewed from radially outside.

FIG. 4A and FIG. 4B depict the piston member 5. FIG. 4A is a plan view of the piston member 5 as viewed from the side of the plurality of locking members 19 along the axis of rotation O. FIG. 4B is a perspective view depicting a part of the piston member 5. FIG. 5 is an enlarged view depicting a first locked portion of the piston member depicted in FIG. 4A and FIG. 4B and a peripheral portion of the first locked portion as viewed from radially outside.

On the piston member 5, a plurality of locked portions locked on the locking members 19 at different positions in the axial direction are formed like steps along the circumferential direction. In the present embodiment, the plurality of locked portions is the first to sixth locked portions 51 to 56. Six sets each composed of the first to sixth locked portions 51 to 56 are formed along the circumferential direction at an end of the piston member 5 on the opposite side from a base end surface 5a with which the rolling bearing 6 comes into abutting contact. The base end surface 5a is an annular flat surface orthogonal to the axial direction of the piston member 5.

On the piston member 5, the six locked portions (first to sixth locked portions 51 to 56) at different distances from the base end surface 5a are formed, and a wall portion 57 circumferentially adjacent to the sixth locked portion 56 is also formed. In the present embodiment, the piston member 5 is provided with the six sets each composed of the first to sixth locked portions 51 to 56 and the wall portion 57 are formed.

The first locked portion 51 is provided with an inclined surface 51a inclined with respect to the circumferential direction of the piston member 5 and an abutting contact surface 51b that comes into abutting contact with the locking member 19 in the circumferential direction. Similarly, the second to sixth locked portions 52 to 56 are provided with inclined surfaces 52a to 56a inclined with respect to the circumferential direction of the piston member 5 and abutting contact surfaces 52b to 56b that come into abutting contact with the locking members 19 in the circumferential direction, respectively.

The inclined surfaces 51a to 56a are surfaces facing the tip surface 19a of the locking member 19 and the opposite surface 41a of the pressing protrusion 41 of the armature 4. The abutting contact surfaces 51b to 56b are surfaces that are parallel to the axial direction of the piston member 5 and that come into abutting contact with a side surface 19b (see FIG. 5) of the locking member 19 in the circumferential direction. The side surface 19b and the tip surface 19a of the locking member 19 form an acute angle.

The piston member 5 rotates in the direction of an arrow depicted in FIG. 5 as a result of operations of the armature 4 and the locking member 19 described below. Thus, after the tip surface 19a and the inclined surface 51a of the piston member 5 slide on each other, the side surface 19b of the locking member 19 comes into abutting contact with the abutting contact surface 51b. The first locked portion 51 of the piston member 5 has a shock mitigation mechanism that mitigates a possible shock when the side surface 19b comes into abutting contact with the abutting contact surface 51b.

In the present embodiment, the shock mitigation mechanism has a rough surface portion 51c formed on the inclined surface 51a of the first locked portion 51 of the piston member 5 to generate frictional resistance between the rough surface portion 51c and the locking member 19 so that the frictional resistance reduces the relative speed between the piston member 5 and the locking member 19 immediately before the locking member 19 comes into abutting contact with the abutting contact surface 51b. The rough surface portion 51c has a higher surface roughness than the inclined surface 51a except for the area in which the rough surface portion 51c is formed. In the present embodiment, the rough surface portion 51c includes a plurality of recesses and protrusions extending in a radial direction of the piston member 5.

Furthermore, the rough surface portion 51c is desirably formed on the abutting contact surface 51b side with respect to a central portion of the inclined surface 51a in the circumferential direction of the piston member 5. In the present embodiment, the rough surface portion 51c is formed near the abutting contact surface 51b.

In the present embodiment, of the first to sixth locked portions 51 to 56, the rough surface portion 51c is formed only on the inclined surface 51a of the first locked portion 51. However, the present embodiment is not limited to this, but the rough surface portion may be formed on each of the inclined surfaces 52a to 56a of the second to sixth locked portions 52 to 56. In the present embodiment, the rough surface portion 51c is formed all over the first locked portion 51 of the piston member 5 in the radial direction, but may be formed on a part of the first locked portion 51 on a radially inner side thereof on which part the tip surface 19a of the locking member 19 slides.

On the first to sixth locked portions 51 to 56, the inclined surfaces 51a, 52a, 53a, 54a, 55a, and 56a of the piston member 5 are inclined so as to have an axial distance from the base end surface 5a increasing with decreasing distance from the wall portion 57. Furthermore, the inclined surface 51a of the first locked portion 51 is shaped like a circular arc as viewed from radially outside and has the largest length in the circumferential direction of the piston member 5, among the inclined surfaces 51a to 56a of the first to sixth locked portions.

The wall portion 57 includes an axial end surface 57a inclined in the same direction as that in which the inclined surfaces 51a to 56a are inclined. One circumferential side surface of the wall portion 57 is an abutting contact surface of the sixth locked portion 56.

The opposite surface 41a of the pressing protrusion 41 of the armature 4 and the tip surface 19a of the locking member 19 come into abutting contact with the inclined surfaces 51a to 56a of the first to sixth locked portions 51 to 56. The opposite surface 41a of the armature 4 comes into abutting contact with outer portions of the inclined surface 51a to 56a in the radial direction of the piston member 5. The tip surface 19a of the locking member 19 comes into abutting contact with inner portions of the inclined surface 51a to 56a in the radial direction of the piston member 5. The piston member 5 receives, from the biasing member 131, an axial bias force under which the inclined surfaces 51a to 56a are pressed against the pressing protrusion 41 of the armature 4 and the locking member 19. When the electromagnetic coil 31 is energized, the armature 4 moves to the first position to press the inclined surfaces 51a to 56a of the first to sixth locked portions 51 to 56.

When the locking member 19 locks the first locked portion 51, the distance between the tip surface 19a of the locking member 19 and the base end surface 5a is shortest. When the locking member 19 locks the sixth locked portion 56, the distance between the tip surface 19a of the locking member 19 and the base end surface 5a is longest.

When the locking member 19 locks the first locked portion 51, the spline teeth 13b of the meshing member 13 completely meshes with the spline teeth 111a of the first rotating member 11 as depicted above the axis of rotation O in FIG. 1. When the locking member 19 locks the second locked portion 52, the spline teeth 13b of the meshing member 13 meshes with some of the spline teeth 111a of the first rotating member 11.

When the locking member 19 locks the third to sixth locked portions 53 to 56, the meshing between the spline teeth 13b of the meshing member 13 and the spline teeth 111a of the first rotating member 11 is released. Furthermore, when the locking member 19 locks the sixth locked portion 56, the outer peripheral surface 162a of the second frictional member 16 is pressed and slides on the inner peripheral surface 142a of the first frictional member 14 as depicted below the axis of rotation O in FIG. 1.

FIGS. 6A to 6D are schematic diagrams depicting the piston member 5, the armature 4, and the locking member 19 as viewed from radially outside, illustrating operations of the piston member 5 and the armature 4 along with the locking member 19.

Figure 6A:
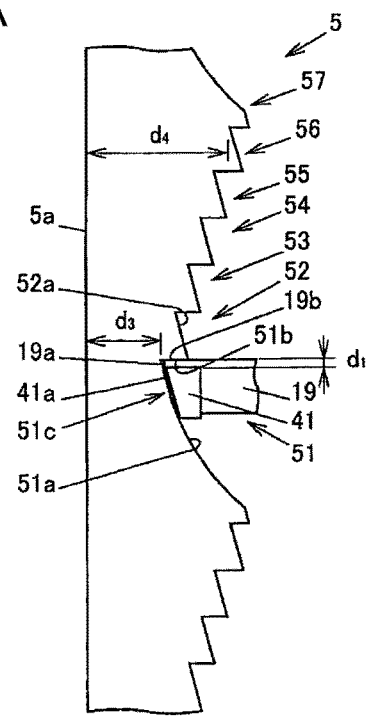
FIGS. 6A to 6D are schematic diagrams illustrating operations of the piston member and the armature along with the locking member.

FIG. 6A depicts a first state where the locking member 19 locks the first locked portion 51 and the armature 4 is in the second position. In this first state, the bias force of the biasing member 131 causes the inclined surface 51a of the first locked portion 51 to be pressed against the tip surface 19a of the locking member 19 and to be placed facing the opposite surface 41a of the pressing protrusion 41 of the armature 4. The side surface 19b of the locking member 19 comes into abutting contact with the abutting contact surface 51b of the first locked portion 51, and the pressing protrusion 41 of the armature 4 is placed facing the inclined surface 51a at a position away from the abutting contact surface 51b in the circumferential direction of the piston member 5. The abutting contact surface 51b of the first locked portion 51 is a step surface formed between the first locked portion 51 and the second locked portion 52 and is a flat surface parallel to the axial direction of the piston member 5. On the first locked portion 51, the angle between the inclined surface 51a and the abutting contact surface 51b is an acute angle.

Figure 6B:
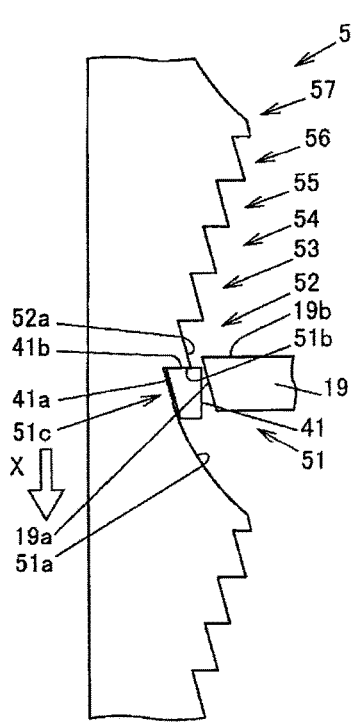

FIG. 6B depicts a second state where the electromagnetic coil 31 is energized to move the armature 4 move from the first state depicted in FIG. 6A to the first position. While the armature 4 is shifting from the first state to the second state, the pressing protrusion 41 presses the inclined surface 51a of the piston member 5 to move the piston member 5 toward the meshing member 13 side in the axial direction. In the second state, the state where the side surface 19b of the locking member 19 is in abutting contact with the abutting contact surface 51b of the first locked portion 51 is cleared. The piston member 5 rotates through a first predetermined angle in the direction of arrow X as a result of sliding of the inclined surface 51a of the first locked portion 51 and the opposite surface 41a of the armature 4 on each other.

The rotation of the piston member 5 brings the abutting contact surface 51b of the first locked portion 51 into abutting contact with a side surface 41b of the pressing protrusion 41 of the armature 4 and causes the inclined surface 52a of the second locked portion 52 to face the tip surface 19a of the locking member 19 in the axial direction. In other words, the armature 4 moves to the first position to press the inclined surface 51a of the first locked portion 51, while rotating the piston member 5 by a predetermined amount, thus causing the inclined surface 52a of the second locked portion 52 to face the locking member 19.

As described above, the armature 4 moves from the second position to the first position in the axial direction to perform a push-in operation of pushing the piston member 5 toward the meshing member 13 side to move the piston member 5 toward the meshing member 13 side, while rotating the piston member 5 through a first predetermined angle. The first predetermined angle corresponds to the distance $d_1$ of the gap between the pressing protrusion 41 of the armature 4 and the abutting contact surface 51b of the first locked portion 51, depicted in FIG. 6A.

Figure 6C:
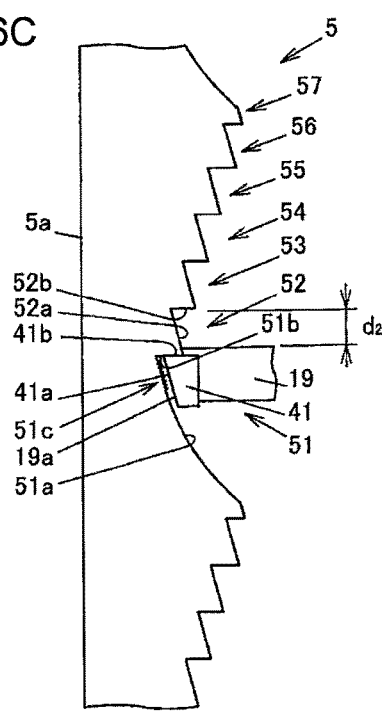

FIG. 6C depicts a third state where the energization of the electromagnetic coil 31 is blocked and the armature 4 is on its way to return from the first position to the second position. In the third state, the tip surface 19a of the locking member 19 and the inclined surface 52a of the second locked portion 52 come into abutting contact with each other, and the side surface 41b of the pressing protrusion 41 of the armature 4 slides on the abutting contact surface 51b of the first locked portion 51. At this time, a torque in the direction of arrow X acts on the piston member 5. However, rotation in the direction of arrow X is regulated by the abutting contact between the side surface 41b of the pressing protrusion 41 of the armature 4 and the abutting contact surface 51b of the first locked portion 51.

Figure 6D:
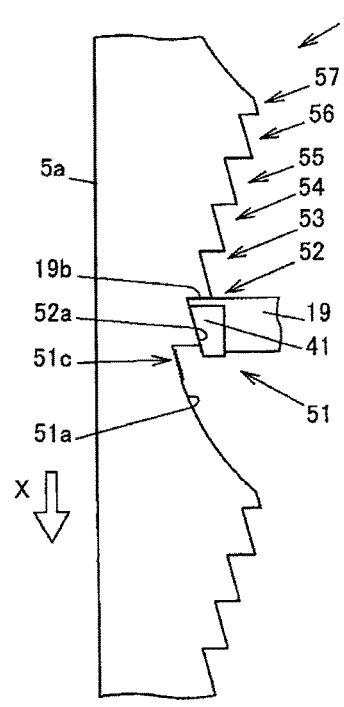

FIG. 6D depicts a fourth state where the armature 4 has returned to the second position and the piston member 5 has rotated in the direction of arrow X until the abutting contact surface 52b of the second locked portion 52 comes into abutting contact with the side surface 19b of the locking member 19. In the fourth state, the piston member 5 rotates through a second predetermined angle with respect to the locking member 19 as a result of the sliding, on each other, of the tip surface 19a of the locking member 19 and the inclined surface 52a of the second locked portion 52 of the piston member 5 that has received the bias force of the biasing member 131. Thus, the locking member 19 locks the second locked portion 52. The second predetermined angle is an angle corresponding to a distance $d_2$ between the abutting contact surface 52b of the second locked portion 52 and the locking member 19 in the third state, depicted in FIG. 6C. In other words, the armature 4 returns from the first position to the second position to further rotate the piston member 5 through the second predetermined angle, causing the locking member 19 to slide on the inclined surface 52a of the second locked portion 52 and come into abutting contact with the abutting contact surface 52b of the second locked portion 52. Thus, the locking member 19 locks the second locked portion 52 adjacent to the first locked portion 51.

When the armature 4 reciprocates several times between the first position and the second position, the piston member 5 moves the meshing member 13 and the second frictional member 16 against the bias force of the biasing member 131. In the present embodiment, since the piston member 5 has the six locked portions shaped like steps (first to sixth locked portions 51 to 56), the start and blockage of energization of the electromagnetic coil 31 are repeated five times to cause five reciprocations of the armature 4, thus rotating the piston member 5 from the position where the locking member 19 locks the first locked portion 51 to the position where the locking member 19 locks the sixth locked portion 56.

As depicted in FIG. 6A, when a distance from the base end surface 5a to the inclined surface 51a of the first locked portion 51 is denoted as $d_3$ and a distance from the base end surface 5a to the inclined surface 56a of the sixth locked portion 56 is denoted as $d_4$, the distance $d_4$ is longer than the distance $d_3$, and the piston member 5 moves forward and backward within the range according to the difference between the distance $d_4$ and the distance $d_3$ in the axial direction.

When the locking member 19 locks the sixth locked portion 56 and the armature 4 is in the first position, the outer peripheral surface 162a of the rib portion 162 of the second frictional member 16 is pressed against the inner peripheral surface 142a of the rib portion 142 in the axial direction. In this case, the elastic member 151 is compressed in the axial direction, and the inner peripheral surface 142a of the first frictional member 14 and the outer peripheral surface 162a of the second frictional member 16 are brought into pressure contact with each other by a restoration force of the elastic member 151. Thus, when the first rotating member 11 and the second rotating member 12 are rotating relative to each other with a difference in rotation speed present, the difference in rotation speed between the first rotating member 11 and the second rotating member 12 gradually decreases due to a frictional force (frictional torque) between the inner peripheral surface 142a of the first frictional member 14 and the outer peripheral surface 162a of the second frictional member 16. The frictional force causes the rotation of the first rotating member 11 and the rotation of the second rotating member 12 to synchronize with each other.

FIGS. 7A to 7D are schematic diagrams illustrating operations performed when the locking member 19 locking the sixth locked portion 56 shifts to the first locked portion 51 and when the meshing member 13 moves in the axial direction along with the piston member 5 to shift the driving force transmission apparatus 1 from the uncoupled state to the coupled state.

FIG. 7A depicts a state where the locking member 19 locks the sixth locked portion 56 and the armature 4 is in the second position. In this state, the locking member 19 comes into abutting contact with the inclined surface 56a and the abutting contact surface 56b of the sixth locked portion 56.

FIG. 7B depicts a state where the armature 4 has moved from the state depicted in FIG. 7A to the first position. While the armature 4 is shifting from the second position to the first position, the pressing protrusion 41 performs the push-in operation of pressing and moving the piston member 5 toward the meshing member 13 side. At this time, a pressing force resulting from the axial movement of the piston member 5 also moves the second frictional member 16 in the axial direction, and thus, the elastic member 151 is further compressed. The push-in operation causes clearance of the state where the locking member 19 is in abutting contact with the abutting contact surface 56b of the sixth locked portion 56. The piston member 5 then rotates through the first predetermined angle in the direction of arrow X.

FIG. 7C depicts a state where the armature 4 is on its way to return from the state depicted in FIG. 7B to the second position. In this state, the tip surface 19a of the locking member 19 comes into abutting contact with the axial end surface 57a of the wall portion 57 and a torque in the direction of arrow X acts on the piston member 5. However, rotation of the piston member 5 in the direction of arrow X is regulated by the abutting contact between the armature 4 and the wall portion 57.

FIG. 7D depicts a state where the armature 4 has returned to the second position and rotation has been made in the direction of arrow X until the locking member 19 locks the first locked portion 51. In this state, the first locked portion 51 of the piston member 5 is locked by the locking member 19 when the side surface 19b of the locking member 19 and the abutting contact surface 51b of the first locked portion 51 come into abutting contact with each other as a result of the sliding, on each other, of the tip surface 19a of the locking member 19 and the inclined surface 51a of the first locked portion 51.

When the tip surface 19a of the locking member 19 slides on the rough surface portion 51c, the frictional force according to the frictional resistance of the rough surface portion 51c decelerates the rotation of the piston member 5. This reduces the relative speed between the side surface 19b of the locking member 19 and the abutting contact surface 51b of the first locked portion 51 when the surfaces collide against each other, resulting in mitigation of a shock caused by the collision. That is, an operating sound can be suppressed which results from a collision of the locking member 19 against the abutting contact surface 51b of the piston member 5.

Furthermore, while shifting from the state depicted in FIG. 7C to the state depicted in FIG. 7D, the piston member 5 is significantly displaced all over the range according to the difference between the distance $d_3$ and the distance $d_4$ in the axial direction. The spline teeth 13b of the meshing member 13 mesh with the spline teeth 111a of the first rotating member 11.

As described above, when the piston member 5 moves axially in the opposite direction from the direction in which the armature 4 is axially moved by the magnetic force, the bias force of the biasing member 131 causes the spline teeth 13b of the meshing member 13 to mesh with the spline teeth 111a of the first rotating member 11. More specifically, when the locking member 19 is unlocked from, among the first to sixth locked portions 51 to 56, the sixth locked portion 56 formed at the position farthest from the meshing member 13, and then locks the first locked portion 51 formed at the position closest to the meshing member 13, the bias force of the biasing member 131 causes the spline teeth 13b of the meshing member 13 to mesh with the spline teeth 111a of the first rotating member 11, resulting in the coupled state where the first rotating member 11 and the second rotating member 12 are coupled together so as to enable the torque to be transmitted. When, among the first to sixth locked portions 51 to 56, the first locked portion 51 formed closest to the meshing member 13 side is locked on the locking member 19, the meshing member 13 couples the first rotating member 11 and the second rotating member 12 together.

The above-described embodiment provides operations and effects described below.

(1) Since the first locked portion 51 of the piston member 5 has the rough surface portion 51c on the inclined surface 51a of the first locked portion 51 serving as the shock mitigation mechanism, the rotation of the piston member 5 can be decelerated when the locking member 19 collides against the abutting contact surface 51b of the piston member 5. A shock at the time of the collision can thus be mitigated. This allows suppression of a possible operating sound when the first rotating member 11 and the second rotating member 12 are coupled together via the meshing member 13.

(2) Since the rough surface portion 51c is formed on a part of the inclined surface 51a (a part of the abutting contact surface 51b), the operating sound can be effectively suppressed, with a possible decrease in responsiveness restrained. In other words, when, for example, recesses and protrusions (rough surface) are formed all over the inclined surface 51a in the circumferential direction, the rotation of the piston member 5 is excessively decelerated when the locking member 19 slides on the inclined surface 51a of the first locked portion 51, thus degrading the responsiveness of switching from the uncoupled state to the coupled state. However, according to the present embodiment, since the rough surface portion 51c is formed only on a part of the inclined surface 51a on the abutting contact surface 51a side, the relative speed between the piston member 5 and the locking member 19 is reduced immediately before the locking member 19 comes into abutting contact with the abutting contact surface 51b, allowing the effect described in (1) to be exerted, with possible degradation of switching responsiveness suppressed.

(3) Since the piston member 5 is formed of a synthetic resin, the piston member 5 has a lower weight and involves a smaller moment of inertia yielded when the piston member 5 rotates with respect to the locking member 19, than the piston member 5 formed of, for example, iron-containing metal. This allows more reliable suppression of a possible operating sound when the first rotating member 11 and the second rotating member 12 are coupled together via the meshing member 13.

Figure 8:
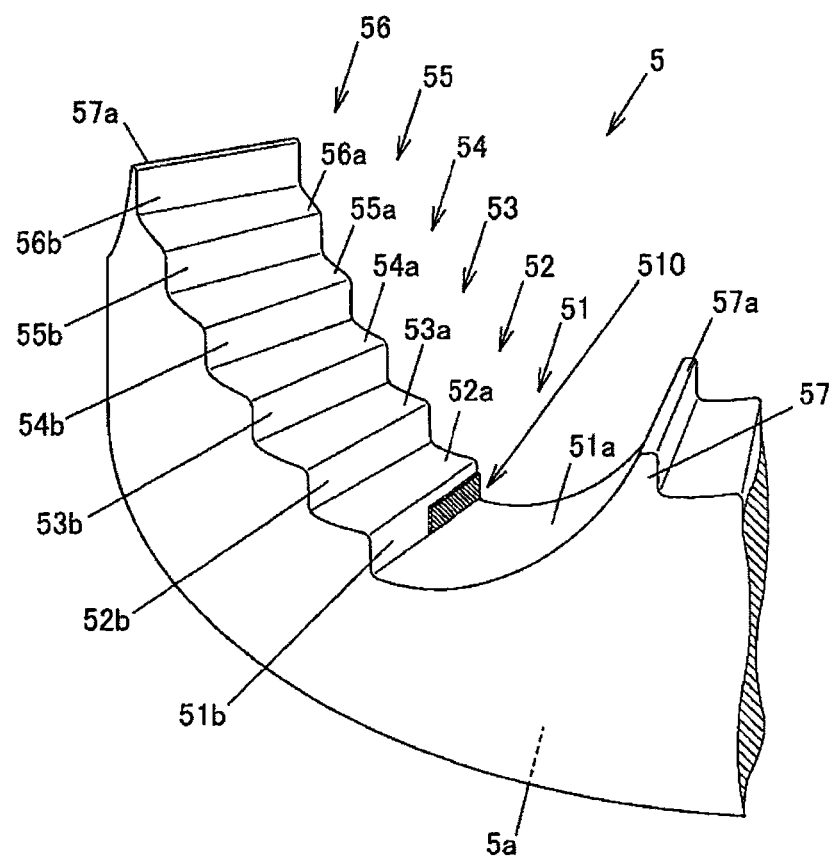
FIG. 8 is a perspective view depicting a part of the piston member according to a second embodiment.
Figure 9:
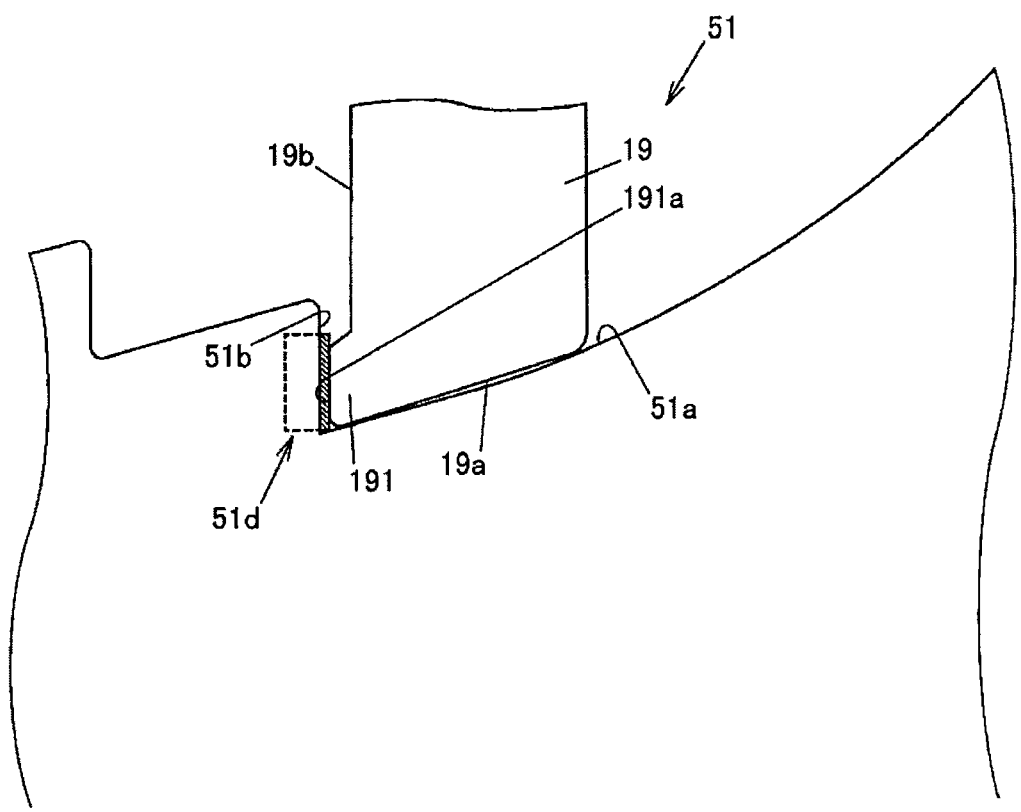
FIG. 9 is an enlarged view of an important part of a piston member according to the second embodiment as viewed from radially outside.

A second embodiment will be described with reference to FIG. 8 and FIG. 9. FIG. 8 is a perspective view depicting a part of a piston member 5 according to the second embodiment. FIG. 9 is an enlarged diagram of a first locked portion 51 of the piston member 5 as viewed from radially outside.

In the second embodiment, components with functions common to the components described in the first embodiment are denoted by the same or corresponding reference numerals and names and will not be described below.

The present embodiment has, as a shock mitigation mechanism that mitigates a possible shock when a locking member 19 comes into abutting contact with an abutting contact surface 51b of the first locked portion 51, a mechanism that absorbs the shock by an elastic member 510 that comes into contact with the locking member 19.

In the present embodiment, the elastic member 510 is an elastic member generally shaped like a rectangular parallelepiped and is fitted in a recessed portion 51d formed in the abutting contact surface 51b of the first locked portion 51 of the piston member 5. However, the shape of the elastic member 510 is not limited as long as the elastic member 510 comes into contact with the locking member 19 before the locking member 19 comes into abutting contact with the abutting contact surface 51b of the first locked portion 51. Various shapes, for example, a cylindrical shape and a plate shape, may be adopted. Furthermore, the elastic member 510 may be fixed, for example, with an adhesive. In FIG. 9, the elastic member 510 in the recessed portion 51d is denoted by a dashed line.

The elastic member 510 partly protrudes out from the recessed portion 51d. A material for the elastic member 510 is not particularly limited as long as the material is elastic enough to mitigate a possible shock when the locking member 19 comes into abutting contact with the abutting contact surface 51b of the first locked portion 51. For example, synthetic rubber or a leaf spring may be used. The present embodiment uses a resin material that is more elastic than the piston member 5, as the elastic member 510. More specifically, a polyester elastomer that is excellent in durability is used as the elastic member 510. The polyester elastomer is suitable as a material for the elastic member 510 in view of its high mechanical strength and elasticity, high heat distortion temperature, high heat resistant temperature, and high moldability.

In the present embodiment, the elastic member 510 is provided in a part of a radially inner side of the piston member 5. However, the present embodiment is not limited to this. For example, the elastic member 510 may be provided in an area that at least comes into abutting contact with a side surface 19b of the locking member 19 or may be formed all over the area in the radial direction.

In the present embodiment, the locking member 19 has a protruding portion 191 with a tip portion protruding toward the abutting contact surface 51b side. Thus, even when the long use of the driving force transmission apparatus 1 leads to compression of the elastic member 510 to reduce the thickness of the protruding portion from the abutting contact surface 51b, a side surface 191a of the protruding portion 191 of the locking member 19, which faces the abutting contact surface 51b, comes into abutting contact with the elastic member 510, allowing the elastic member 510 to reliably come into contact with the elastic member 510.

The driving force transmission apparatus including the piston member 5 according to the present embodiment operates similarly to the driving force transmission apparatus 1 described in the first embodiment with reference to FIG. 6 and FIG. 7. During shifting from the state depicted in FIG. 7C to the state depicted in FIG. 7D, a tip surface 19a of the locking member 19 and the elastic member 510 slide on each other to bring the side surface 191a of the protruding portion 191 of the locking member 19 into abutting contact with the elastic member 510. The elastic member 510, due to its elasticity, absorbs a possible shock when the locking member 19 collides against the abutting contact surface 51b of the piston member 5. In other words, the relative speed between the piston member 5 and the locking member 19 is reduced immediately before the locking member 19 comes into abutting contact with the abutting contact surface 51b, allowing suppression of a possible operating sound when the first rotating member 11 and the second rotating member 12 are coupled together via the meshing member 13.

A third embodiment will be described with reference to FIGS. 10A to 10C. FIGS. 10A to 10C are schematic diagrams of a piston member 5 and a locking member 19 illustrating a shock mitigation mechanism according to the present embodiment. In FIGS. 10A to 10C, components with functions common to the components described in the first embodiment are denoted by the same or corresponding reference numerals and names and will not be described below.

In the present embodiment, as a shock mitigation mechanism that mitigates a possible shock when a locking member 19 comes into abutting contact with an abutting contact surface 51b of a first locked portion 51, an inclined surface 51a of the first locked portion 51 is defined by a steep inclined surface portion 511a and a gentle inclined surface portion 512a having different inclination angles with respect to the circumferential direction of the piston member 5. The steep inclined surface portion 511a is provided on a wall portion 57 side, and the gentle inclined surface portion 512a is provided on the abutting contact surface 51a side. The inclination angle θ1 of the steep inclined surface portion 511a with respect to the circumferential direction is larger than the inclination angle θ2 of the gentle inclined surface portion 512a with respect to the circumferential direction (θ1>θ2). Furthermore, in the present embodiment, the inclination angle θ2 of the gentle inclined surface portion 512a is equal to the angle through which a tip surface 19a of the locking member 19 is inclined with respect to the circumferential direction of the piston member 5. The tip surface 19a of the locking member 19 comes into surface contact with the gentle inclined surface portion 512a.

The driving force transmission apparatus including the piston member 5 according to the present embodiment operates similarly to the driving force transmission apparatus described in the first embodiment and the second embodiment with reference to FIG. 6 and FIG. 7. While the locking member 19 locking a sixth locked portion 56 of the piston member 5 is shifting to the state where the locking member 19 locks the first locked portion 51, the tip surface 19a of the locking member 19 slides on the steep inclined surface portion 511a of the inclined surface 51a and then further on the gentle inclined surface portion 512a and comes into abutting contact with the abutting contact surface 51b.

FIG. 10A depicts a state where the locking member 19 is sliding on the steep inclined surface portion 511a. In this state, when a bias force received by the piston member 5 from a biasing member 131 is denoted by F, the piston member 5 receives a force F×sin θ1 in a rotating direction (the direction of arrow in FIG. 10A) from the locking member 19.

FIG. 10B depicts a state where the locking member 19 is sliding on the gentle inclined surface portion 512a. In this state, the piston member 5 receives a force F×sin θ2 in the rotating direction (the direction of arrow in FIG. 10B) from the locking member 15. However, due to a relation θ1>θ2, the torque received by the piston member 5 is lower than when the locking member 19 slides on the steep inclined surface portion 511a.

Since the tip surface 19a of the locking member 19 comes into abutting contact with the gentle inclined surface portion 512a, a frictional force generated between the tip surface 19a of the locking member 19 and the gentle inclined surface portion 512a causes the piston member 5 to receive a rotational resistance force. The frictional force is increased by a load imposed on the locking member 19 by the piston member 5. However, in the present embodiment, when the tip surface 19a of the locking member 19 comes into contact with (collides against) the gentle inclined surface portion 512a, the load temporarily increases and the resultant frictional force significantly reduces the speed of the piston member 5.

Then, the locking member 19 slides on the gentle inclined surface portion 512a until the side surface 19b of the locking member 19 comes into abutting contact with the abutting contact surface 51b of the first locked portion 51.

Since the gentle inclined surface portion 512a with an inclination angle smaller than the inclination angle of the steep inclined surface portion 511a is provided on the abutting contact surface 51b, the present embodiment reduces the relative rotation speed between the piston member 5 and the locking member 19 when the locking member 19 comes into abutting contact with the abutting contact surface 51b of the first locked portion 51 compared to a case where the inclined surface 51a of the first locked portion 51 is defined, for example, only by the steep inclined surface portion 511a (a case where the whole inclined surface 51a is inclined at the inclination angle θ1 with respect to the circumferential direction). This allows suppression of a possible operating sound when the first rotating member 11 and the second rotating member 12 are coupled together.

Furthermore, compared to a case where, for example, the inclined surface 51a of the first locked portion 51 is defined only by the gentle inclined surface portion 512a (a case where the whole inclined surface 51a is inclined at the inclination angle θ2 with respect to the circumferential direction), the present embodiment enables a reduction in the distance that the locking member 19 slides on the inclined surface 51a. Moreover, since the piston member 5 moves at relatively high speed in the axial direction when the locking member 19 slides on the steep inclined surface portion 511a, the present embodiment reduces the duration from the state where the locking member 19 locks the sixth locked portion 56 of the piston member 5 to the state where the locking member 19 locks the first locked portion 51. That is, the relative speed between the piston member 5 and the locking member 19 is reduced immediately before the locking member 19 comes into abutting contact with the abutting contact surface 51b, allowing a possible operating sound to be effectively suppressed, with possible degradation of responsiveness restrained. Effects similar to the above-described effects can be produced even when the inclination angle is gradually changed toward the side of the abutting contact surface 51b of the inclined surface 51a.

The present invention has been described based on the first to third embodiments. However, the present invention is not limited to these embodiments but may be implemented in various manners without departing from the spirits of the present invention. For example, in the embodiments, the case has been described where the shock mitigation mechanism is provided only on the first locked portion 51 among the first to sixth locked portions 51 to 56. However, the present invention is not limited to this. The shock mitigation mechanism may be provided on some or all of the second to sixth locked portions 52 to 56.

Furthermore, the shock mitigation mechanisms illustrated in the first to third embodiments may be combined together for implementation. For example, besides the rough surface portion 51c, the elastic member 510 may be provided on the inclined surface 51a. Moreover, the inclined surface 51a may include the steep inclined surface portion 511a and the gentle inclined surface portion 512a, in addition to the rough surface portion 51c and/or the elastic member 510.

When the piston member 5 is formed of a synthetic resin, the effect that suppresses the operating sound can be enhanced. However, when any of the shock mitigation mechanisms illustrated in the first to third embodiments allows the operating sound to be sufficiently suppressed, the piston member 5 may be formed of metal such as iron. This case enhances durability compared to the case where the piston member 5 is formed of the synthetic resin.

In the above-described embodiments, the case has been described where the piston member 5 is provided with the six sets each composed of the first to sixth locked portions 51 to 56. However, the number of the sets of the first to sixth locked portions 51 to 56 is not limited to six as long as multiple sets of locked portions are formed. Furthermore, the number of locked portions (the number of steps) in one set is not limited. However, the number of steps is desirably at least three in order to ensure axial strokes of the meshing member 13 and the second frictional member 16.

What is claimed is:

1. A driving force transmission apparatus comprising:
   a first rotating member;
   a second rotating member;
   a switching member that moves in an axial direction to enable switching of the first rotating member and the second rotating member between a coupled state and an uncoupled state;
   a cylindrical piston member that includes a plurality of locked portions formed like steps along a circumferential direction and that moves in the axial direction along with the switching member;
   a pressing member arranged facing the locked portions of the piston member and moving forward and backward between a first position where the pressing member presses the piston member in the axial direction and a second position where the pressing member does not press the piston member;
   a biasing member that biases the piston member in the opposite direction from a pressing direction of the pressing member; and
   a locking member that locks a locked portion of the plurality of locked portions; wherein
   the locked portion of the piston member is provided with an inclined surface inclined with respect to a circumferential direction of the piston member and an abutting contact surface that comes into abutting contact with the locking member in the circumferential direction,
   the pressing member moves to the first position to press the inclined surface of the locked portion and rotates the piston member by a predetermined amount to cause an inclined surface of an adjacent locked portion to face the locking member,
   when the pressing member returns to the second position, the locking member slides on the inclined surface to come into abutting contact with the abutting contact surface, and
   the inclined surface of the locked portion adjacent the abutting contact surface has a characteristic different from the inclined surface of the locked portion more distant from the abutting contact surface, which characteristic slows the locking member sliding on the inclined surface having the characteristic as compared to the locking member sliding on the inclined surface not having the characteristic, whereby a shock when the locking member comes into abutting contact with the abutting contact surface is mitigated,
   wherein the characteristic of the inclined surface adjacent the abutting contact surface is a surface friction that is greater than that of the inclined surface more distant from the abutting contact surface.

* * * * *